| (12) | United States Patent | (10) Patent No.: US 11,027,789 B2 |
|---|---|---|
| | Kuchly et al. | (45) Date of Patent: Jun. 8, 2021 |

(54) BLOCKING KEY FOR A WIPER LINKAGE, LINKAGE SUB ASSEMBLY, AND LINKAGE COMPRISING A BLOCKING KEY; METHOD FOR INSTALLING A BLOCKING KEY ON A WIPER LINKAGE

(71) Applicant: Valeo Systèmes d'Essuyage, Le Mesnil Saint Denis (FR)

(72) Inventors: Nicolas Kuchly, Issoire (FR); Pascal Renoux, Issoire (FR); Frédéric Baud, Issoire (FR); Robin Viard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 281 days.

(21) Appl. No.: 15/997,117

(22) Filed: Jun. 4, 2018

(65) Prior Publication Data

US 2018/0346044 A1 Dec. 6, 2018

(30) Foreign Application Priority Data

Jun. 5, 2017 (FR) ...................................... 1754966

(51) Int. Cl.
  *B62D 65/02* (2006.01)
  *F16H 21/40* (2006.01)
  (Continued)

(52) U.S. Cl.
  CPC ............ *B62D 65/022* (2013.01); *B60S 1/045* (2013.01); *B60S 1/245* (2013.01); *F16B 3/00* (2013.01); *F16H 21/40* (2013.01)

(58) Field of Classification Search
  CPC ........ B62D 65/022; B60S 1/045; B60S 1/245; B60S 1/0433; B60S 1/043; B60S 1/24;
  (Continued)

(56) References Cited

U.S. PATENT DOCUMENTS 10,710,655 B2 * 7/2020 Kuchly ................. B62D 65/022
2006/0168754 A1 * 8/2006 Metz ..................... B60S 1/0488
  15/250.31

(Continued)

FOREIGN PATENT DOCUMENTS

DE       10313540 A1   10/2004
DE   102009043116 A1    4/2010
  (Continued)

OTHER PUBLICATIONS

Prelimiary Search Report and Written Opinion issued in corresponding French Patent Application No. 1754966, dated Feb. 1, 2018 (7 pages).

*Primary Examiner* — Luis A Gonzalez
(74) *Attorney, Agent, or Firm* — Osha Bergman Watanabe & Burton LLP

(57) ABSTRACT

The present invention concerns a key (1) for locking a link including a U-section and a crank of a linkage of a wiper mechanism in a transport position, characterized in that it comprises:
  a shaft (11) having at one end a radial holding excrescence (13) and at the other end an enlarged head (15) intended to cooperate with a hollow part of the U-section forming the link, and
  a first radial finger (17) configured to be housed in a slot for locking the link in the transport position.

15 Claims, 4 Drawing Sheets

(51) Int. Cl.
*B60S 1/24* (2006.01)
*F16B 3/00* (2006.01)
*B60S 1/04* (2006.01)

(58) Field of Classification Search
CPC .......... F16H 21/40; F16H 21/18; F16H 21/24; F16H 21/28; F16B 3/00
See application file for complete search history.

(56) References Cited

U.S. PATENT DOCUMENTS

2018/0345914 A1* 12/2018 Renoux ................. B60S 1/0469
2018/0346043 A1* 12/2018 Viard ..................... F16H 21/40

FOREIGN PATENT DOCUMENTS

| | | |
|---|---|---|
| DE | 102014207287 A1 | 10/2015 |
| DE | 102015216894 A1 | 3/2017 |
| WO | 2008/037691 A1 | 4/2008 |

\* cited by examiner

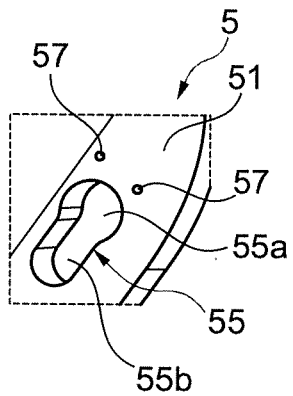
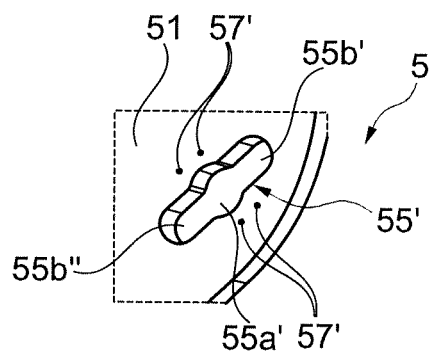
Fig. 5A     Fig. 5B
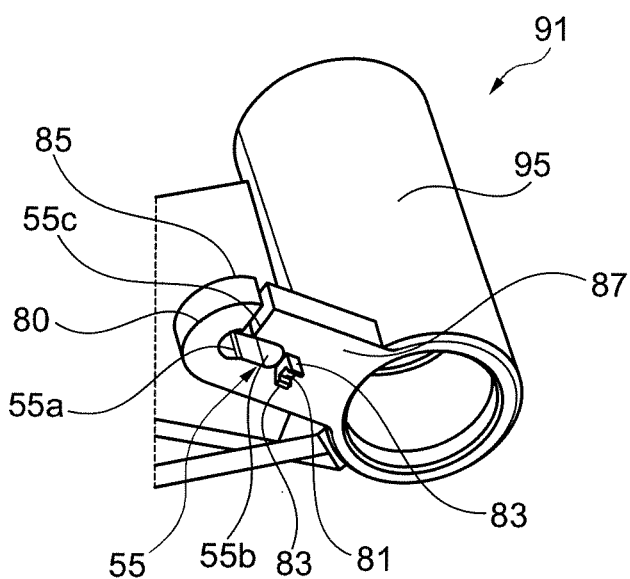
Fig. 6
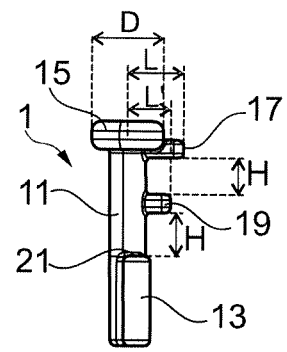
Fig. 7A
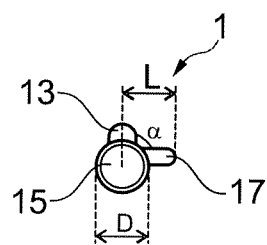
Fig. 7B
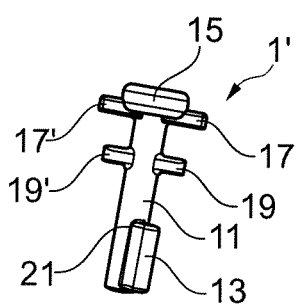
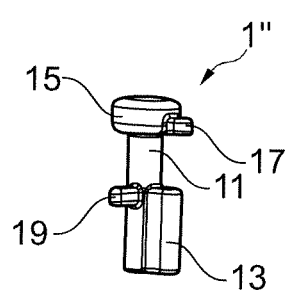
Fig. 8     Fig. 9

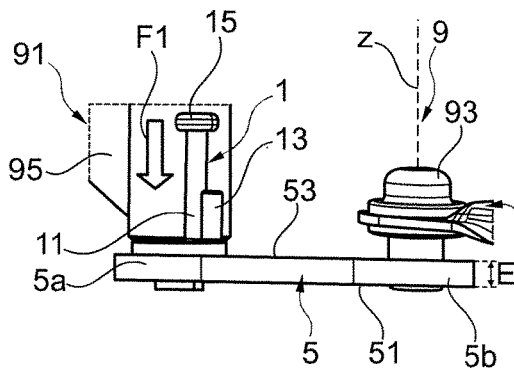
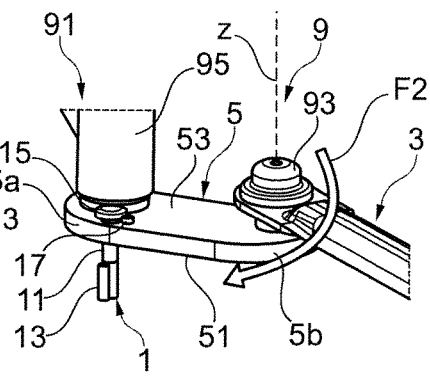
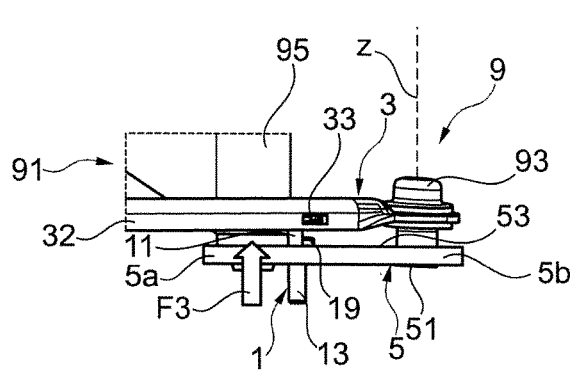
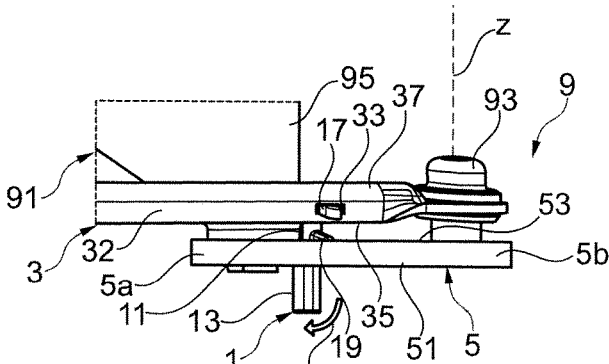
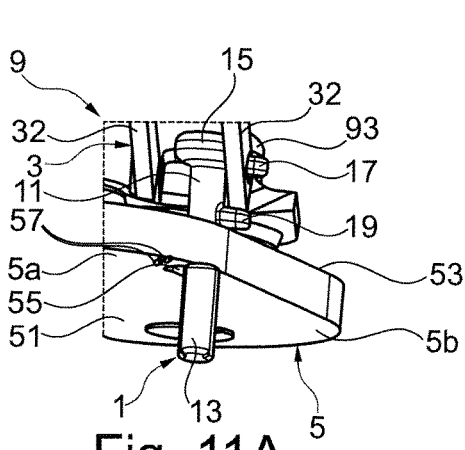
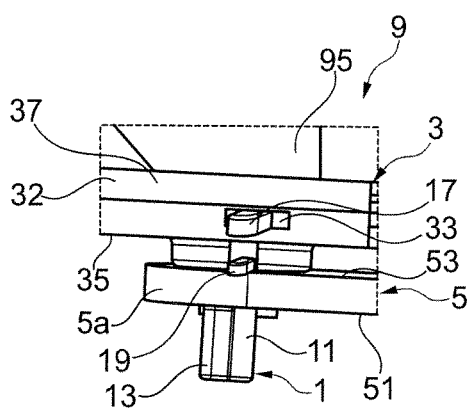

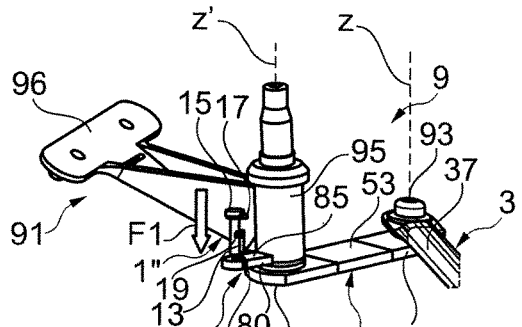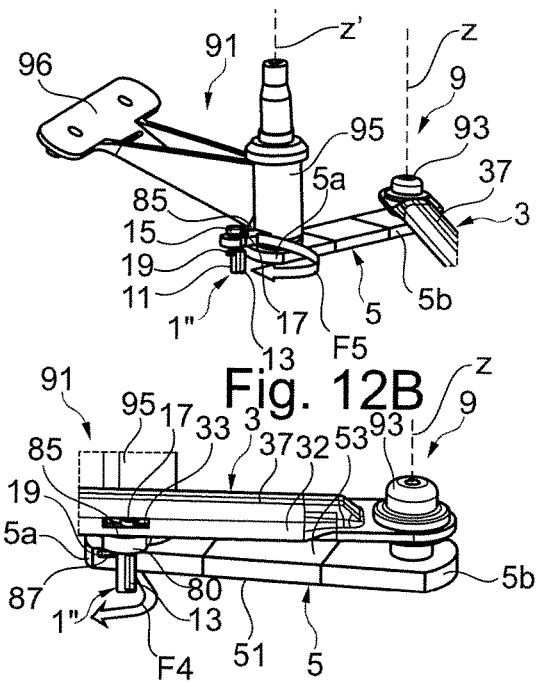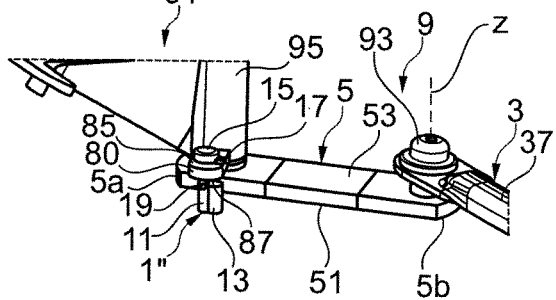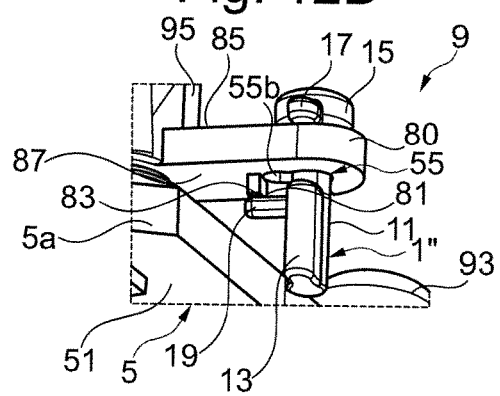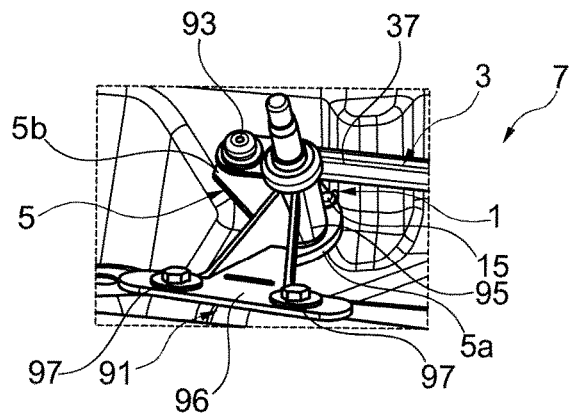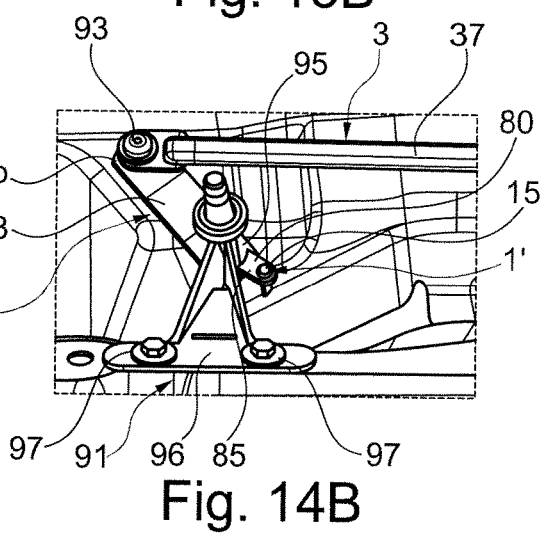

BLOCKING KEY FOR A WIPER LINKAGE, LINKAGE SUB ASSEMBLY, AND LINKAGE COMPRISING A BLOCKING KEY; METHOD FOR INSTALLING A BLOCKING KEY ON A WIPER LINKAGE

TECHNICAL FIELD

The present invention relates to the field of the linkages of wiper mechanisms, in particular for motor vehicles, and more particularly to locking these linkages in a transport position. The present invention relates more specifically to a key for locking a linkage comprising at least one crank and at least one link in a transport position. The present invention relates equally to a linkage subassembly and to a linkage including such a locking key, and equally to a method of placing such a locking key on a linkage.

BACKGROUND

Motor vehicle wiper mechanism linkages are systems articulated at various locations. This articulation is necessary for the correct functioning of the wiper system once the linkage has been installed on the motor vehicle. However, this kind of articulation causes problems in particular for transporting this linkage and for installing it on the motor vehicle. Accordingly, it is necessary to limit the degrees of freedom of the linkage both during transport and during installation thereof.

There are known locking elements enabling connection of the link to bearings enabling fixing of the linkage to the motor vehicle so that the linkage is in a transport position. The known prior art locking elements can take various forms, such as a clamp form, for example, in order to lock this linkage in a transport and installation position, that is to say in a position in which all movement of a bearing of the linkage relative to the link is prevented.

SUMMARY

However, these locking elements described in this document are for single use and are removed by cutting, for example after installation of the linkage on the motor vehicle. Accordingly, it is necessary to use tools, generally cutting tools, in order to be able to release the linkage. Moreover, this kind of locking element produces debris that it will be necessary to process afterwards, which generates additional costs.

An objective of the present invention is to alleviate at least partly the disadvantages of the prior art described above.

Another objective of the present invention, different from the preceding objective, is to propose a locking element of a linkage of a wiper mechanism in particular for motor vehicles that can be removed without necessitating tools.

Another objective of the present invention, different from the preceding objectives, is to propose a locking element that can remain on the linkage of the wiper mechanism once the latter has been installed so as to reduce the production of waste to be processed.

Another objective of the present invention, different from the preceding objectives, is to propose a locking element that is simple to install on a linkage of a wiper mechanism.

A further objective of the present invention, different from the preceding objectives, is to propose a locking element that enables simple release of the linkage of the wiper mechanism.

To this end, in order to achieve at least one of the aforementioned objectives at least partially, the present invention consists in a key for locking a link including a U-section and a crank of a linkage of a wiper mechanism in a transport position, comprising:

a shaft having at one end a radial holding excrescence and at the other end an enlarged head intended to cooperate with a hollow part of the U-section forming the link, and a first radial finger configured to be housed in a slot for locking the link in the transport position.

The locking key locks the linkage in the transport position by locking the position of the link relative to the crank. This locking key is advantageously fitted without necessitating tools. Moreover, releasing this linkage does not necessitate the use of tools either.

The locking key may further have one or more of the following features separately or in combination.

The enlarged head has a cylindrical general shape the diameter of which corresponds to the distance between the branches of the U-section of the link.

The first radial finger is carried by the enlarged head.

The blocking key further comprises a second radial finger.

The first and second radial fingers extend for example in the same direction or in opposite directions, that is to say directions forming an angle of 180°. In a variant the first and second radial fingers extend in directions forming a non-zero angle, preferably other than 90°.

The length of the first radial finger is greater than the length of the second radial finger.

According to one embodiment, the second radial finger is configured to cooperate with an edge of the crank disposed facing the link when the link and the crank of the linkage are in the transport position. Also according to this embodiment, the axial distance between the first radial finger and the second radial finger corresponds to the thickness of the crank.

The radial holding excrescence is offset angularly from the first and/or second radial finger(s), the angular offset between the radial holding excrescence and the first and/or second radial finger(s) is in particular between 30° and 120° inclusive, in particular equal to 90°.

The radial holding excrescence comprises an abutment surface, in particular an upper surface. According to one embodiment this surface is in particular intended to cooperate with a face of the crank opposite a face disposed facing the link.

According to one embodiment, the distance between the abutment surface of the radial holding excrescence and the second radial finger corresponds to the thickness of the crank.

According to a variant, the locking key further comprises a second first radial finger, in particular disposed symmetrically with respect to the first radial finger relative to the shaft and/or a second second radial finger, in particular disposed symmetrically with respect to the second radial finger relative to the shaft.

According to another variant, the locking key further comprises a second radial finger disposed in particular at the level of an end of the part of the radial holding excrescence disposed facing the enlarged head, said second radial finger and said radial holding excrescence being configured to cooperate with a face of a bearing disposed opposite a face disposed facing the link.

According to this other variant, the first radial finger and the second radial finger extend in particular in different directions.

According to this other variant, the first radial finger and the radial holding excrescence extend in particular in the same direction.

The shaft of the locking key is in particular of cylindrical shape.

The locking key may be made of a plastic material or of metal.

The present invention also consists in a subassembly of a linkage of a wiper mechanism comprising:
a bearing,
a crank articulated on the bearing, said crank having a first end connected to the bearing and a second end carrying a ball-joint, and
a link one end of which is connected by the ball joint to the crank,
the crank or the bearing including an in particular elongate through-opening configured to receive a locking key as defined above, and the link including a U-section including a locking slot intended to receive the first radial finger of the locking key.

The linkage subassembly may further comprise one or more of the following features separately or in combination.

According to one aspect, the through-opening includes a first part intended to receive the shaft of the locking key and an oblong second part configured to allow the radial holding excrescence to pass and to block the passage of the first radial finger because of its greater length.

According to a variant, the through-opening is in the crank and the crank may have a first face opposite that disposed facing the link and comprising two abutments configured to cooperate with at least one abutment surface of the radial holding excrescence in order to limit the rotary movement of the locking key when that locking key is in a locking position.

In a manner complementary to that variant, the second radial finger may be configured to cooperate with the two abutments when the locking key is in an unlocked position.

According to one aspect, the through-opening is disposed in the vicinity of a bush enabling the articulation of the crank on the bearing.

According to another aspect, the bearing has an appendix disposed opposite the ball joint when the linkage is in the transport position, the appendix including the through-opening.

According to this other aspect, the through-opening has a third part corresponding to a slot disposed at the level of the first part and extending perpendicularly to that first part, said third part being configured to allow the second radial finger to pass.

Also according to this other aspect, the appendix includes a housing disposed on a face opposite a face disposed facing the link, said housing being configured to cooperate with the second radial finger when the locking key is in an unlocked position so as to hold that locking key in place.

The present invention also consists in a linkage of a wiper mechanism comprising a first linkage subassembly and a second linkage subassembly connected to one another by a link, the first linkage subassembly and/or the second linkage subassembly is a linkage subassembly as defined above, said first linkage subassembly and/or said second linkage subassembly is adapted to be locked in the transport position of the linkage with the aid of the locking key.

According to one embodiment, the first and second linkage subassemblies correspond to the linkage subassembly defined above and each end of the link is locked in the transport position of the linkage with the aid of the locking key.

The linkage advantageously further comprises a motor connected to at least one crank, said motor being configured to allow the movement in translation of the link.

The motor is installed on a second side of the linkage.

The locking of the first or second linkage subassembly in the transport position of the linkage with the aid of the locking key is reversible.

The present invention also consists in method of placing in a locking position a locking key as defined above on a linkage subassembly as defined above in order to lock a linkage in the transport position, the method comprising at least one of the following steps:
rotating the link around the ball joint in order to position the linkage in the transport position, and
pressing on the locking key at the level of the radial holding excrescence so as to enable insertion of the enlarged head in the U-section of the link, and
rotating the locking key so that the first radial finger enters the locking slot on the link.

The placement method may further comprise one or more of the following features separately or in combination.

The locking key may be rotated in the clockwise or anti-clockwise direction.

During the last step of the placement method, the abutment surface of the radial holding excrescence comes to be placed between the two abutments disposed on the face of the crank opposite that facing the link.

According to a variant, the crank includes the through-opening intended to receive the locking key and the method further comprises at least one of the following steps:
inserting the locking key in the face of the crank disposed facing the link so that the radial holding excrescence projects from the face of the crank opposite that disposed facing the link,
rotating the locking key inside the crank so as to bring the first radial finger into contact with the face of the crank facing the link.

According to another variant, the bearing includes the appendix including the through-opening intended to receive the locking key and the method further comprises at least one of the following steps:
inserting the locking key in the face of the appendix disposed facing the link so that the shaft cooperates with the first part of the through-opening, the radial holding excrescence cooperates with the second part of the through-opening, and the second radial finger cooperates with the third part of the through-opening,
pulling the radial holding excrescence in the direction away from the link so as to bring the first radial finger into contact with the face of the appendix disposed facing the link.

The linkage is released by rotating the locking key so that the first radial finger leaves the locking slot and enters the U-section and then pulling the radial holding excrescence so as to bring the first radial finger into contact with the face of the crank disposed facing the link.

According to one aspect, releasing the link may further comprise an additional step of rotating the locking key so that the second radial finger cooperates with the abutments disposed on the face of the crank opposite that facing the link.

According to another aspect, releasing the link may further comprise an additional step of rotating the locking key so that the second radial finger cooperates with the housing of the appendix.

According to a first release variant, the locking key remains on the crank after the linkage is released.

According to a second release variant, the locking key remains on the appendix after the linkage is released.

According to a third release variant, the locking key is removed from the crank or from the appendix after release of the linkage.

A locking key according to the invention is advantageously installed from the first side and a locking key according to the invention is advantageously installed from the second side of the linkage.

BRIEF DESCRIPTION OF THE DRAWINGS

Other features and advantages of the present invention will become more clearly apparent on reading the following description given by way of nonlimiting illustration and from the appended drawings, in which:

FIG. 5A is a diagrammatic perspective view of a face of the crank from FIG. 4 according to a first embodiment, FIG. 5B is a diagrammatic perspective view of a face of the crank from FIG. 4 according to a second embodiment, FIG. 6 is a diagrammatic perspective view of a bearing including an appendix including a through-opening intended to cooperate with a locking key, FIG. 7A is a diagrammatic side view of a locking key according to a first embodiment, FIG. 7B is a diagrammatic view from above of the locking key from FIG. 7A, FIG. 8 is a diagrammatic side view of a locking key according to a second embodiment, FIG. 9 is a diagrammatic side view of a locking key according to a third embodiment, FIGS. 10A to 10D show different diagrammatic views of a linkage subassembly cooperating with a locking key according to a first embodiment of the invention, FIGS. 11A and 11B are diagrammatic representations in perspective of the linkage subassembly from FIGS. 10A-D locked in the transport position, FIGS. 12A to 12D are diagrammatic representations of a linkage subassembly according to a second embodiment, FIG. 13A is another diagrammatic perspective view of the linkage subassembly from FIGS. 12A-D, FIG. 13B is a diagrammatic low-angle perspective view of the linkage subassembly from FIG. 13A, and in particular of the appendix, FIG. 14A is a diagrammatic partial perspective view of a linkage according to the first embodiment installed on a motor vehicle, and FIG. 14B is a diagrammatic partial perspective view of a linkage according to the second embodiment installed on a motor vehicle.

In these figures, identical elements bear the same reference numbers.

DETAILED DESCRIPTION

The following embodiments are examples. Although the description refers to one or more embodiments, this does not necessarily mean that each reference concerns the same embodiment or that the features apply only to only one embodiment. Single features of different embodiments may equally be combined or interchanged to produce other embodiments.

The following description refers to a first and to a second radial finger, to a first and to a second end of the crank, to a first and to a second face of the crank, to a first, to a second and to a third part of the through-opening, to a first and to a second linkage subassembly, to a first and to a second side of the linkage, to a first and to a second oblong part of the through-opening, and to a first and to a second face of the appendix. This is merely indexing to differentiate and to designate elements that are close but not identical. This indexing does not imply any priority of one element over another and such designations may easily be interchanged without departing from the scope of the present description. Nor does this indexing imply an order in time, for example to assess the disposition of the linkage on the motor vehicle, its operation, or again its installation, or again to appreciate the shape of the locking key or its installation on the linkage in order to hold the latter in the transport position.

In the following description, there is meant in particular by "transport position" a position in which at least one end of the link and a crank to which that end of the link is connected form a minimal angle. To be more precise, at least this end of the link is in a position close to the bearing on which the crank is articulated so that the linkage has a minimal overall size when it is in the transport position.

Figure 1:
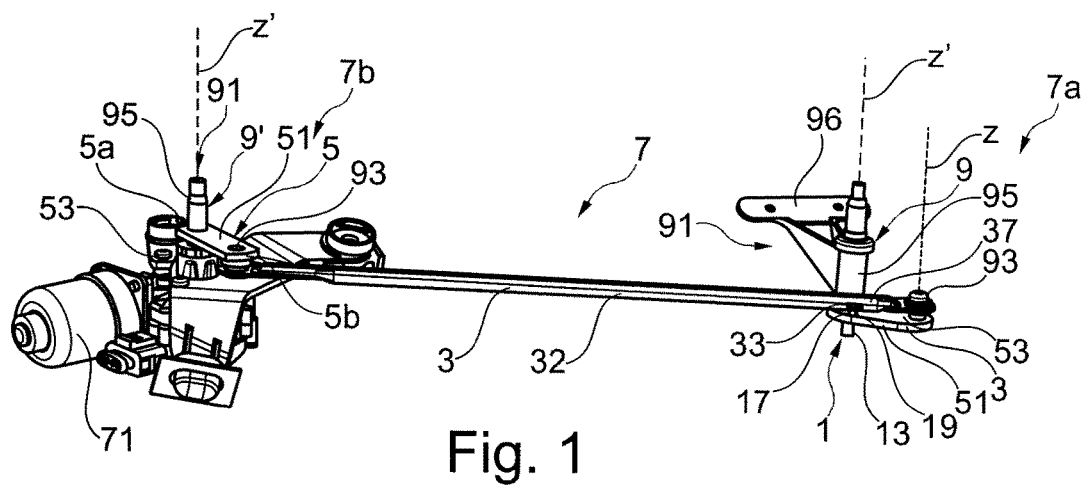
FIG. 1 is a diagrammatic perspective view of a linkage locked in a transport position with the aid of a locking key according to the invention.

Referring to FIG. 1, there is represented a linkage 7 of a wiper mechanism of a motor vehicle. The linkage 7 comprises a first linkage subassembly 9 (seen better in FIGS. 2A to 6) disposed on a first side 7a of the linkage 7, a second linkage subassembly 9' disposed on a second side 7b of the linkage 7, and also a motor 71 configured to enable movement in translation of a link 3 connecting the first linkage subassembly 9 and the second linkage subassembly 9' and to drive with an alternating pivoting movement axes Z' intended to carry wiper arms (not shown).

The first linkage subassembly 9 and the second linkage subassembly 9' comprise a bearing 91 and a crank 5 articulated on the bearing 91.

The crank 5 has a first end 5a connected to the bearing 91 by a pivot connection for example and a second end 5b carrying a ball joint 93 on which the link 3 is articulated at the level of an end 37 in particular about a rotation axis Z.

Moreover, the link 3 is a U-section having branches 32 delimiting a hollow part disposed facing the crank 5. The hollow part of the U-section is intended to receive an enlarged head 15 of a locking key 1 (seen in FIGS. 7A to 9). The locking key 1 thus disposed enables locking of the articulation of the link 3 on the ball joint 93 about the rotation axis Z.

According to the particular embodiment from FIG. 1, the linkage 7 is locked in a transport position. More particularly, rotation about the axis Z of the end 37 of the link 3 on the ball joint 93 carried by the first linkage subassembly 9 is locked. According to this embodiment, the link 3 corresponds to a U-section and includes in at least one branch 32 a locking slot 33 disposed at the level of the end 37 of the link 3. In order to stabilize the locking key 1 in a locking position and to lock the linkage 7 in its transport position, the locking key 1 includes a first radial finger (visible in particular in FIGS. 7A to 9) intended to cooperate with the locking slot 33 when the linkage 7 is held in the transport position. The cooperation of the first radial finger 17 with the locking slot 33 makes it possible to maintain a fixed relative position of the link 3 and the crank 5 in the various directions in which the link 3 can be articulated on the ball joint 93.

According to the particular embodiment from FIG. 1, the motor 71 is disposed on the second side 7*b* of the linkage 7. The second side 7*b* of the linkage 7 generally corresponds to the driver side when the linkage 7 is installed on a motor vehicle. According to a variant, the second side 7*b* may correspond to the passenger side of the motor vehicle when the linkage 7 is installed on the latter. Moreover, the motor 71 is connected to at least one crank 5 in order to enable the movement in translation of the link 3.

According to the particular embodiment from FIG. 1, the locking key 1 is disposed in the first linkage subassembly 9 that corresponds to the first side 7*a* of the linkage 7 in order to lock that end 37 of the link 3 in the transport position.

According to another embodiment not represented here, the first linkage subassembly 9 and the second linkage subassembly 9' can be similar and each include a locking key 1 in order to lock the first side 7*a* and the second side 7*b* of the linkage 7 so as to retain each end of the link 3 fixed relative to the bearings 91 of the first linkage subassembly 9 and the second linkage subassembly 9'.

According to another particular embodiment, the first linkage subassembly 9 including the locking key 1 may correspond to the linkage subassembly 9 disposed on the second side 7*b* of the linkage 7.

According to a further embodiment not shown here, only the second linkage subassembly 9' includes the locking key 1. Accordingly, only the end 37 of the link 3 connected to this second linkage subassembly 9' is locked in the transport position of the linkage 7.

Locking the articulation of the link 3 on the ball joint 93 advantageously makes it possible to facilitate transporting that linkage 7 by eliminating degrees of freedom of movement of some parts of the linkage 7. Moreover, transporting this linkage 7 is also facilitated because the latter has a minimal overall size. Moreover, locking this articulation also makes it possible to facilitate the installation of this linkage 7 on the motor vehicle by locking the articulation of the link 3 on the ball joints 93 carried by each of the cranks 5.

There are shown in more detail in FIGS. 2A, 3 to 5A, 7A and 7B the elements of the linkage 7 (FIGS. 2A and 3 to 5A) cooperating with a locking key 1 (FIGS. 7A and 7B) together with the details of the locking key 1 according to a first embodiment.

Figure 4:
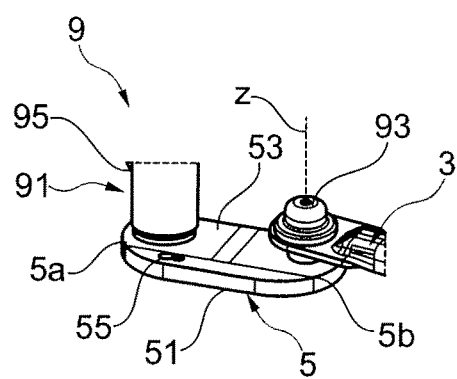
FIG. 4 is a diagrammatic perspective view of a linkage subassembly including a crank shown in more detail.

Referring to FIGS. 4 and 5A, the crank 5 has a first face 51 opposite a second face 53 disposed facing the link 3. The crank 5 includes a through-opening 55 configured to receive the locking key 1 (seen better in FIGS. 7A and 7B). The through-opening 55 in the crank 5 is elongate and is disposed in the vicinity of a bush 95 enabling the articulation of the crank 5 on the bearing 91. In addition to locking the movement of the link 3 on the ball joint 93, this kind of disposition makes it possible to hold the link 3 in a fixed position relative to the bush 95 when the linkage 7 is in the transport position.

Figure 3:
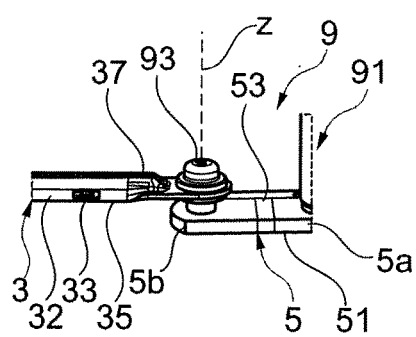
FIG. 3 is a diagrammatic perspective view of a linkage subassembly including a link portion shown in more detail.

Referring to FIG. 3, the link 3 includes the locking slot 33 disposed in a wall 32 of the U-section forming the link 3. This locking slot 33 is configured to cooperate with the first radial finger 17 of the locking key 1.

In the various embodiments shown, in particular in FIGS. 7A and 7B, the locking key 1 comprises a shaft 11 and a first radial finger 17.

The shaft 11 has at one end a radial holding excrescence 13 and at the other end the enlarged head 15 intended to cooperate with the hollow part of the U-section forming the link 3. The enlarged head 15 has in particular a cylindrical general shape the diameter D of which corresponds to the distance between the branches 32 of the U-section of the link 3. The diameter D of the enlarged head 15 is moreover greater than at least one dimension of the through-opening 55. Moreover, the radial holding excrescence 13 is configured to pass through the through-opening 55 in order to allow positioning of the locking key 1 inside that through-opening 55. Accordingly, the locking key 1 is prevented from passing through the through-opening 55.

According to the particular embodiment from FIGS. 7A and 7B, the locking key 1 is produced for example by injection moulding a plastic material in one piece. According to another embodiment not represented here, the locking key 1 may be made of metal.

Moreover, the locking key 1 further comprises a second radial finger 19 configured to cooperate with the second face 53 of the crank 5 that faces the link 3 when the link 3 and the crank 5 of the linkage 7 are in the transport position. Also, according to this particular embodiment the shaft 11 of the locking key 1 has a cylindrical shape. The use of a cylindrical shape for the shaft 11 makes it possible to improve the cooperation of that shaft 11 with the through-opening 55 and also to facilitate the rotating the locking key 1 inside that through-opening 55.

According to a variant, the shaft 11 may have a regular polygonal section in particular with at least five sides.

The first radial finger 17 is positioned for example near the enlarged head 15 and is intended to be housed in the locking slot 33 of the link 3 in the transport position. The second radial finger 19 is intended to cooperate with, and to be more precise to be in contact with, the second face 53 of the crank 5 when the locking key is in a raised transport position. According to the particular embodiment from FIGS. 7A and 7B, the first radial finger 17 and the second radial finger 19 extend in the same direction and are therefore aligned angularly. Moreover, the length L of the first radial finger 17 is greater than the length L' of the second radial finger 19.

Moreover, the first radial finger 17 and the second radial finger 19 are spaced by a height H that corresponds to a thickness E of the crank 5 (visible in FIG. 10A). That thickness E corresponds to the thickness E between the first face 51 and the second face 53 of the crank 5. Also, the radial holding excrescence 13 is offset angularly from the first radial finger 17 and the second radial finger 19. More particularly, the angular offset a between the radial holding excrescence 13 and the first radial finger 17 and the second radial finger 19 is between 30° and 60° inclusive, and according to the preferred embodiment from FIG. 7B equal to 45°. Moreover, the distance between the upper part of the radial holding excrescence 13 disposed opposite the end of the locking key 1 and the second radial finger 19 also corresponds to the thickness E of the crank 5. Accordingly, when the locking key 1 is in the locking position the position of the link 3 relative to the crank 5 is fixed. In fact, the locking key 1 connects the end 37 of the link 3 to the crank 5 in order to maintain the position of the end 37 of the link 3 fixed relative to the bearing 91 and to be more precise relative to the first end 5*a* of the crank 5.

Referring to FIGS. 5A, 7A and 7B, the through-opening 55 of the crank 5 according to this first embodiment includes a first part 55*a* intended to receive the shaft 11 of the locking key 1 and an oblong second part 55*b* configured to allow the passage of the second radial finger 19 and to block the passage of the first radial finger 17 because of its greater length L. The through-opening 55 therefore has a keyhole shape. Moreover, the radial holding excrescence 13 comprises an abutment surface 21 intended to cooperate with the first face 51 of the crank 5. According to this particular embodiment, the first face 51 of the crank 5 comprises two abutments 57 configured to cooperate with the abutment surface 21 in order to limit the rotational movement of the locking key 1 when that locking key 1 is in its locking position in which the locking key 1 holds the linkage 7 in the transport position. Moreover, these abutments 57 can also be configured to cooperate with the second radial finger 19 when the locking key 1 is in an unlocked position in order to hold the locking key 1 in that unlocked position. According to this first embodiment, the locking position of the locking key 1 may correspond to a raised position of the enlarged head 15 relative to the second face 53 of the crank 5 and the unlocked position of the locking key 1 may correspond to a lowered position of the locking key in which the first radial finger 17 may be in contact with the second face 53 of the crank 5 for example.

Figure 2A:
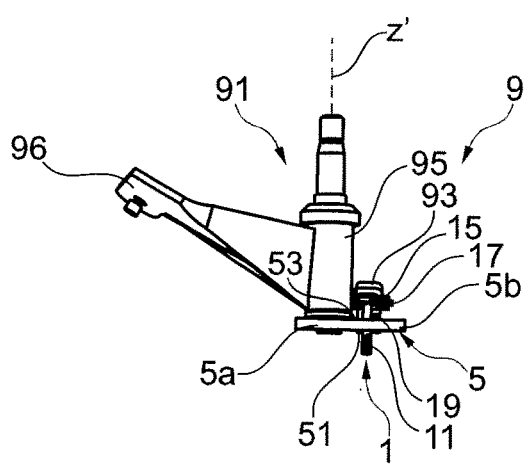
FIG. 2A is a diagrammatic perspective view of a linkage subassembly including a locking key in accordance with a first embodiment.
Figure 2B:
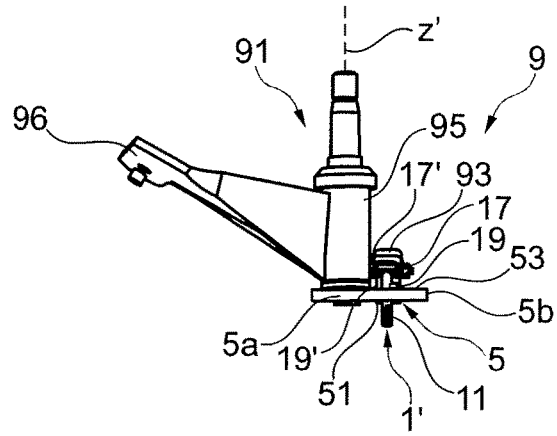
FIG. 2B is a diagrammatic perspective view of a linkage subassembly including a locking key according to a second embodiment.

Referring to FIGS. 2B, 5B and 8, there is represented a linkage subassembly 9 including a locking key 1' according to a second embodiment for locking the linkage 7 in the transport position.

According to this second embodiment, the link 3 includes two locking slots 33 disposed one facing the other on respective walls 32 of the U-section. Referring to FIG. 8, the locking key 1' further comprises a second first radial finger 17' disposed symmetrically with respect to the first radial finger 17 relative to the shaft 11 and a second second radial finger 19' disposed symmetrically with respect to the second radial finger 19 relative to the shaft 11. According to this section embodiment, the first radial finger 17 and the third radial finger 17' each cooperate with a locking slot 33.

Referring to FIG. 5B, the shape of the through-opening 55' is adapted to allow the passage of the shaft 11 of the locking key 1' and the second radial finger 19 and the second second radial finger 19'. The through-opening 55' may for example have a propeller shape with two blades, for example having a centre 55a' of circular shape and a first oblong part 55b' and a second oblong part 55b" of the through-opening 55'. Moreover, the first face 51 of the crank also includes abutments 57' intended to cooperate with the second radial finger 19 and the second second radial finger 19' when the locking key 1' is in its unlocked position.

According to another variant not shown here, the locking key 1 may include only the first radial finger 17, the second radial finger 19, and the third radial finger 17'. According to this variant, the shape of the through-opening 55 may still be identical to that from FIG. 5A.

Referring to FIG. 6, there is represented a bearing 91 intended to cooperate with the locking key 1" according to a third embodiment from FIG. 9 in order to hold the linkage 7 from FIG. 1 in the transport position.

Referring to FIG. 6, the bearing 91 includes an appendix disposed at the level of the part of the bush 95 enabling the connection with the crank 5. The appendix 80 has a first face 85 disposed facing the link 3 when the linkage 7 is in the transport position and a second face 87 opposite that first face 85. Moreover, the appendix 80 is disposed opposite the ball joint 93 when the linkage 7 is in the transport position. The appendix 80 includes the through-opening 55 intended to cooperate with the locking key 1".

According to this third embodiment, the through-opening 55 includes the first part 55a intended to receive the shaft 11 of the locking key 1" and the oblong second part 55b. The through-opening 55 further includes a third part 55c corresponding to a slot disposed at the level of the first part 55a and extending perpendicularly to the first part 55a, and more particularly perpendicularly to the axis of the oblong opening in the second part 55b. This third part 55c of the through-opening 55 is configured to allow the passage of the second radial finger 19 of the locking key 1" in order to facilitate positioning it in the through-opening 55.

Moreover, the second face 87 of the appendix 80 includes a housing 81 configured to cooperate with the second radial finger 19 of the locking key 1" when the latter is in its unlocked position, in particular in order to hold it in place at the level of the through-opening 55. To this end, the housing 81 has two lugs 83 disposed on respective opposite sides of the latter. The distance between these two lugs 83 is at least equal to the width of the second radial finger 19.

Referring to FIG. 9, the locking key 1" according to this third embodiment includes the first radial finger 17 carried by the enlarged head 15. Moreover, the second radial finger 19 is disposed at the level of one end of the radial holding excrescence 13 disposed facing the enlarged head 15. According to this third embodiment, the second radial finger 19 and the end of the radial holding excrescence 13 carrying the second radial finger 19 are configured to cooperate with the second face 87 of the appendix 80. According to this third embodiment, the first radial finger 17 and the second radial finger 19 extend in different directions. Moreover, the first radial finger and the radial holding excrescence 13 extend in the same direction.

Referring to FIGS. 10A to 10D and 12A to 12D, there is represented a method of placing the locking key 1 in a locking position on the linkage subassembly 9 in order to lock at least one end 37 of the link 3 of the linkage 7 in the transport position.

Referring to FIGS. 10B and 12B, the method employs a step of rotating the link 3. The rotation about the ball joint 93 is shown by the arrow F2 in the example shown. The rotation enables the linkage 7 to be positioned in its transport position, and to be more precise causes the hollow part of the U-section of the link to face the enlarged head 15 of the locking key 1.

Referring to FIG. 10C, the method can then employ a step b of pressing on the locking key 1. Pressing on the radial holding excrescence 13, as shown by the arrow F3, enables the insertion of the enlarged head 15 inside the U-section between the walls 32 of the link 3. When the locking key 1 has been inserted between the walls 32 of the link 3, the articulation of the latter on the ball joint 93 about the rotation axis Z is locked.

Referring to FIGS. 10D and 12D, in order to hold the locking key 1 in place, the method employs a step c of rotating the locking key 1. In the example shown this step is effected as shown by the arrow F4 so that the first radial finger 17 enters the locking slot 33 carried by the link 3. During this step c, the locking key 1 may rotate in the clockwise direction or in the anti-clockwise direction. This step c of rotating the locking key 1 makes it possible to maintain the position of the link 3 fixed relative to the first end 5a of the crank 5 for example.

According to the particular embodiment from FIGS. 10C to 11A, 12C and 12D, the enlarged head 15 has a diameter D (visible in FIGS. 7A and 7B) substantially equal to the distance separating the walls 32 of the U-section forming the link 3. Moreover, the first radial finger 17 projects into the locking slot 33 so that the position of the link 3 relative to the bush 95 is fixed until the link 3 is released in order to enable the linkage 7 to quit its transport position.

The locking of the linkage 7 in the transport position therefore does not necessitate the use of any tools.

Referring to FIGS. 10A to 10D, there is represented the placing in a locking position of the locking key 1 according to a first embodiment. According to that first embodiment, the locking key corresponds to the locking key 1 described with reference to FIGS. 7A and 7B and is installed in the through-opening 55 carried by the crank 5 described with reference to FIGS. 4 and 5A.

Referring to FIG. 10A, the method may further comprise a step a'1 of inserting the locking key 1 in the second face 53 of the crank 5 disposed facing the link 3 as shown by the arrow F1 so that the radial holding excrescence 13 projects from the first face 51 of the crank 5. During this step a'1, the locking key 1 is inserted in the through-opening 55 until the second radial finger 19 is in contact with the second face 53 of the crank 5. Accordingly, the distance between the abutment surface 21 of the radial holding excrescence 13 and the second radial finger 19 is at least equal to the thickness E of the crank 5 and preferably equal to the thickness E of the crank 5.

The method may then employ a step a'2 of rotating the locking key 1 inside the through-opening 55 of the crank 5 so as to place the second radial finger 19 facing the second part 55b of the through-opening 55 in order to bring the first radial finger 17 into contact with the second face 53 of the crank 5. In fact, the second part 55b of the through-opening 55 has dimensions allowing only the second radial finger 19 to pass through it but blocking the passage of the first radial finger 17 because of its greater length L.

During the step c of rotating the locking key 1 so that the first radial finger 17 enters the locking slot 33, the second radial finger 19 is oriented in a direction substantially perpendicular to the length of the second part 55b of the through-opening 55. Also, during this step the abutment surface 21 of the locking key 1 may optionally come to be inserted between the two abutments 57 carried by the first face 51 in the vicinity of the first end 5a of the crank 5. Moreover, referring to FIGS. 10D to 11B, a surface of the second radial finger 19 disposed opposite a surface facing the first radial finger 17 is in contact with the second face 53 of the crank 5 in order to reinforce the locking of the linkage 7 in the transport position. Moreover, according to the particular embodiment from FIGS. 11A and 11B, the distance between the abutment surface 21 of the radial holding excrescence 13 and the second radial finger 19 is equal to the thickness E of the crank 5. Accordingly, in the locking position, the locking key 1 holds both the position of the link 3 relative to the crank 5 about the rotation axis Z of the ball joint 93 and the spacing between the second face 53 of the crank 5 and the link 3 fixed.

Referring to FIGS. 12A to 12D, there is represented a method of placing in a locking position the locking key 1 according to a second embodiment. According to that second embodiment, the locking key 1 corresponds to the locking key 1" described with reference to FIG. 9 inserted in the through-opening 55 in the appendix 80 of the bearing 91 described with reference to FIG. 6.

Referring to FIG. 12A, the method further comprises a step a"1 of inserting the locking key 1 in the first face 85 of the appendix 80. This step a"1 of inserting the locking key 1 is effected as shown by the arrow F1 so that the shaft 11 cooperates with the first part 55a of the through-opening 55, the radial holding excrescence 13 cooperates with the oblong second part 55b of the through-opening 55, and the second radial finger 19 cooperates with the third part 55c of the through-opening 55. The method may also comprise a step a"2 of pulling the radial holding excrescence 13 in the direction away from the link 3 so as to bring the first radial finger 17 into contact with the first face 85 of the appendix 80.

According to this second embodiment, the appendix 80 is disposed at the level of the bush 95 so that the surface of the U-section of the link 3 disposed facing the first face 85 can come into contact with that first face 85 as shown in FIG. 12C. Accordingly, this link 3 can be locked by rotating the locking key 1 in such a manner that the first radial finger 17 enters the locking slot 33. Finger 12C is a diagrammatic representation of the linkage subassembly during the step of rotating a link so as to place the linkage subassembly in a transport position.

The first and second methods of locking the link 3 may be implemented using the locking keys 1, 1', 1" described in accordance with the first, second and third embodiments as well as with a corresponding through-opening 55 either in the crank 5 or in the appendix 80.

Referring to FIGS. 11A, 11B, 13A and 13B, the linkage 7 is released by rotating the locking key 1 so that the first radial finger 17 exits the locking slot 33 and enters the U-section.

Referring to FIGS. 11A and 11B, there is represented a first mode of release of the linkage 7. According to this first release mode, the second radial finger 19 is disposed facing the second part 55b of the through-opening 55 during the rotation of the locking key 1. The enlarged head 15 of the locking key 1 can then be withdrawn from the U-section by pulling the radial holding excrescence 13 in a direction away from the link 3 so as to bring the first radial finger 17 into contact with the second face 53 of the crank 5 and to enable the second radial finger 19 to pass through the oblong second part 55b of the through-opening 55. Thus the locking key 1 returns to the unlocked position shown in FIG. 10B. The release of the link 3 may optionally comprise an additional step of rotating the locking key 1 so as to insert the second radial finger 19 between the abutments 57 (visible in FIGS. 5A and 5B) disposed on the first face 51 of the crank 5. This additional step advantageously enables the locking key 1 to be held in place in the unlocked position because the distance H between the first radial finger 17 and the second radial finger 19 is equal to the thickness E of the crank 5.

Referring to FIGS. 13A and 13B, there is represented a second mode of release of the linkage 7. This second release mode may include a step of disposing the second radial finger 19 in the housing 81 on the second face 87 of the appendix 80. The locking key 1 is therefore retained in the through-opening 55 in the appendix 80.

This release is preferably effected once the linkage 7 is installed on the motor vehicle. The release of the linkage 7 advantageously necessitates no tools. Moreover, this release is effected by a simple rotation. This release is therefore simple and can be easily carried out.

Referring to FIGS. 14A and 14B, there is partially represented the linkage 7 installed on the motor vehicle with the aid of fixing screws 97. The locking key 1 may remain on the crank 5 (FIG. 14A) or on the appendix 80 (FIG. 14B) after release of the linkage 7 because the link 3 cannot come into contact with this locking key 1 during its movement in translation. Leaving the locking key 1 on the crank 5 or on the appendix 80 advantageously enables the linkage 7 to be locked again subsequently, if necessary, and enables the production of waste linked to the installation of this linkage 7 on the motor vehicle to be limited.

The various embodiments explained above are provided by way of nonlimiting illustration. In fact, it is entirely possible for the person skilled in the art to modify the shape of the through-opening 55 or the structure of the locking key 1 without departing from the scope of the present invention. Moreover, the person skilled in the art could use constituent materials of the locking key 1 other than those described in the preceding examples without departing from the context of the present description. Moreover, the person skilled in the art could remove the locking key 1 from the linkage 7 after release of the link 3 without departing from the context of the present description.

The first and second radial fingers extend for example in the same direction or in opposite directions, that is to say directions forming an angle of 180°. In a variant the first and second radial fingers extend in directions forming a non-zero angle, preferably other than 90°. Similarly the length of the first radial finger is greater than the length of the second radial finger without this feature being limiting on the invention.

Moreover, in a nonlimiting manner, the directions of the first radial finger and the radial holding excrescence may form a non-zero angle alpha, as shown for example in FIG. 7B. Alternatively, the first radial finger and the radial holding excrescence may extend in the same, zero, direction, as shown for example in FIG. 9.

Accordingly, holding a linkage 7 in place in a transport position is possible thanks to the locking key 1 described above. The locking key 1 is advantageously installed on the linkage 7 without necessitating tools and releasing the linkage 7 is equally possible without necessitating tools. Moreover, the use of this kind of locking key 1 makes it possible to limit the waste to be processed because it may remain on the linkage 7 after its installation on the motor vehicle.

The invention claimed is:

1. A key for locking a link including a U-section and a crank of a linkage of a wiper mechanism in a transport position, the key comprising:
   a shaft having at one end a radial holding excrescence and at another end an enlarged head that cooperates with a hollow part of the U-section forming the link; and
   a first radial finger configured to be housed in a slot for locking the link in the transport position.

2. The key according to claim 1 wherein the enlarged head has a cylindrical general shape a diameter of which corresponds to a distance between a plurality of branches of the U-section of the link.

3. The key according to claim 1, further comprising a second radial finger configured to cooperate with an edge of the crank disposed facing the link when the link and the crank of the linkage are in the transport position.

4. The key according to claim 1, wherein the radial holding excrescence comprises an upper abutment surface that cooperates with a first face of the crank opposite a second face disposed facing the link.

5. The key according to claim 3, further comprising a second first radial finger disposed symmetrically with respect to the first radial finger relative to the shaft and a second second radial finger disposed symmetrically with respect to the second radial finger relative to the shaft.

6. The key according to claim 3, wherein the second radial finger is disposed at a level of an end of the radial holding excrescence disposed facing the enlarged head, said second radial finger and said end of the radial holding excrescence being configured to cooperate with a first face of a bearing disposed opposite a second face disposed facing the link.

7. A subassembly of a linkage of a wiper mechanism comprising:
   a bearing;
   a crank articulated on the bearing, said crank having a first end connected to the bearing and a second end carrying a ball-joint; and
   a link, one end of which is connected by the ball-joint to the crank,
   wherein the crank or the bearing includes an elongate through-opening configured to receive the key according to claim 1, and
   wherein the link includes a U-section including a locking slot that receives the first radial finger of the key for locking.

8. The subassembly according to claim 7, wherein the elongate through-opening includes a first part that receives the shaft of the key and an oblong second part configured to allow the radial holding excrescence to pass and to block a passage of the first radial finger because of its greater length.

9. The subassembly according to claim 7, wherein the elongate through-opening is in the crank and the crank has a face opposite that disposed facing the link and comprising two abutments configured to cooperate with at least one abutment surface of the radial holding excrescence to limit a rotary movement of the key when the key is in a locking position.

10. The subassembly according to claim 9, wherein the elongate through-opening is disposed in a vicinity of a bush enabling the articulation of the crank on the bearing.

11. The subassembly according to claim 8, wherein the bearing has an appendix disposed opposite the ball-joint when the linkage is in the transport position and in that the appendix includes the elongate through-opening.

12. The subassembly according to claim 11, wherein the elongate through-opening includes a third part corresponding to a slot disposed at a level of the first part and extending perpendicularly to that first part, said third part being configured to allow the second radial finger to pass.

13. The subassembly according to claim 11, wherein the appendix includes a housing disposed on a face opposite a face disposed facing the link, said housing being configured to cooperate with the second radial finger when the key is in an unlocked position so as to hold that key in place.

14. A linkage of a wiper mechanism comprising:
   a first linkage subassembly; and
   a second linkage subassembly connected to the first linkage subassembly by a link,
   wherein the first linkage subassembly and/or the second linkage subassembly is the subassembly according to claim 7, and
   said first linkage subassembly and/or said second linkage subassembly is adapted to be locked in the transport position of the linkage with the aid of the key.

15. A method of placing in a locking position the key for locking according to claim 1 on a linkage subassembly to lock the linkage subassembly in the transport position, the method comprising:
   rotating the link around a ball-joint to position the linkage subassembly in the transport position;
   pressing on the key at a level of the radial holding excrescence so as to enable insertion of the enlarged head in the U-section of the link; and
   rotating the key so that the first radial finger enters a locking slot on the link.

* * * * *